(12) United States Patent
Hoppe et al.

(10) Patent No.: US 9,733,116 B2
(45) Date of Patent: Aug. 15, 2017

(54) FILL LEVEL MEASUREMENT SYSTEM

(71) Applicant: SKF LUBRICATION SYSTEMS GERMANY AG, Berlin (DE)

(72) Inventors: Peter Hoppe, Berlin (DE); Juergen Kreutzkaemper, Waibstadt-Daisbach (DE); Holger Schmidt, Klein-Machnow (DE)

(73) Assignee: SKF LUBRICATION SYSTEMS GERMANY GMBh, Walldorf (DE)

( * ) Notice: Subject to any disclaimer, the term of this patent is extended or adjusted under 35 U.S.C. 154(b) by 17 days.

(21) Appl. No.: 14/786,862

(22) PCT Filed: Apr. 23, 2014

(86) PCT No.: PCT/EP2014/058183
§ 371 (c)(1),
(2) Date: Oct. 23, 2015

(87) PCT Pub. No.: WO2014/173925
PCT Pub. Date: Oct. 30, 2014

(65) Prior Publication Data
US 2016/0146656 A1 May 26, 2016

(30) Foreign Application Priority Data
Apr. 24, 2013 (DE) .................. 10 2013 207 446

(51) Int. Cl.
*G01F 23/26* (2006.01)
(52) U.S. Cl.
CPC .......... *G01F 23/263* (2013.01); *G01F 23/266* (2013.01); *G01F 23/268* (2013.01)

(58) Field of Classification Search
CPC .... G01F 23/263; G01F 23/266; G01F 23/265; G01F 23/268
See application file for complete search history.

(56) References Cited

U.S. PATENT DOCUMENTS 3,648,165 A 3/1972 Shawhan
3,995,488 A 12/1976 Crawley
(Continued)

FOREIGN PATENT DOCUMENTS

DE         19757190 A1  6/1999
DE     102006030857 A1  1/2007
(Continued)

*Primary Examiner* — Hezron E Williams
*Assistant Examiner* — David Z Huang
(74) *Attorney, Agent, or Firm* — Bryan Peckjian; SKF USA Inc. Patent Dept.

(57) ABSTRACT

A fill-level measurement apparatus for measuring a fill level of a fluid in a container includes a housing having a first end and a second end and first and second substantially identical thin capacitive sensors mounted on a carrier plate in the housing. The carrier plate includes a circuit board and a microcontroller is mounted on the circuit board. The first sensor is mounted in the housing at a first distance from the first end with a surface portion in contact with a first inner wall portion of the housing, and the second sensor is mounted in the housing between the first sensor and the second end of the housing with a clearance of 0.5 to 10 centimeters from a second inner wall portion of the housing, and the first sensor and the second sensor are configured to communicate with the microcontroller.

10 Claims, 5 Drawing Sheets

(56) References Cited

U.S. PATENT DOCUMENTS

| | | | |
|---|---|---|---|
| 4,806,847 A | 2/1989 | Atherton | |
| 4,864,857 A | 9/1989 | Koon | |
| 2003/0000303 A1* | 1/2003 | Livingston | G01F 23/268 73/304 C |
| 2009/0139325 A1 | 6/2009 | Cunningham et al. | |
| 2011/0110792 A1 | 5/2011 | Mauro et al. | |

FOREIGN PATENT DOCUMENTS

| | | |
|---|---|---|
| DE | 602004010446 T2 | 11/2008 |
| EP | 1961575 A2 | 8/2008 |

\* cited by examiner

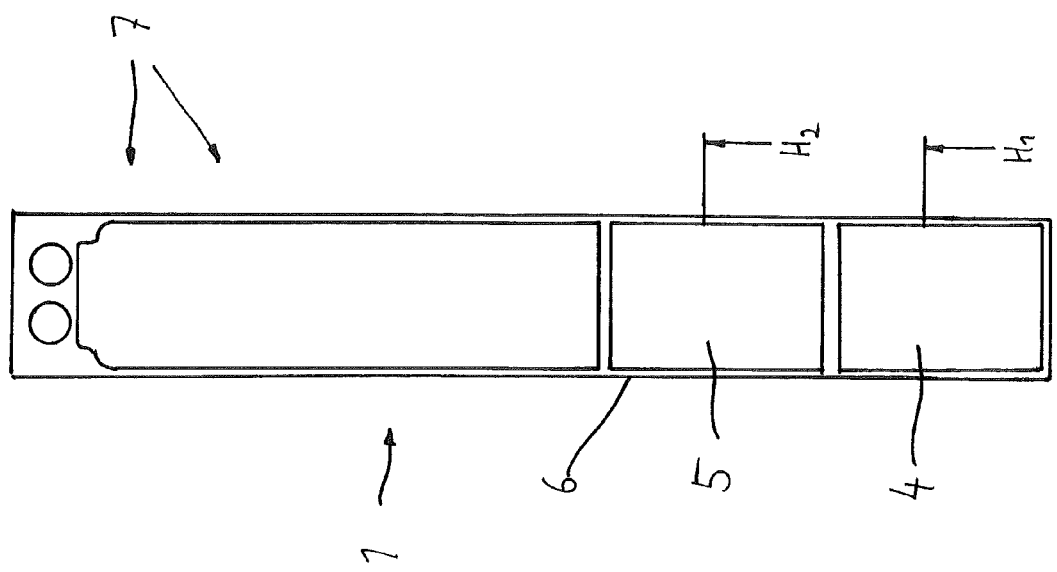

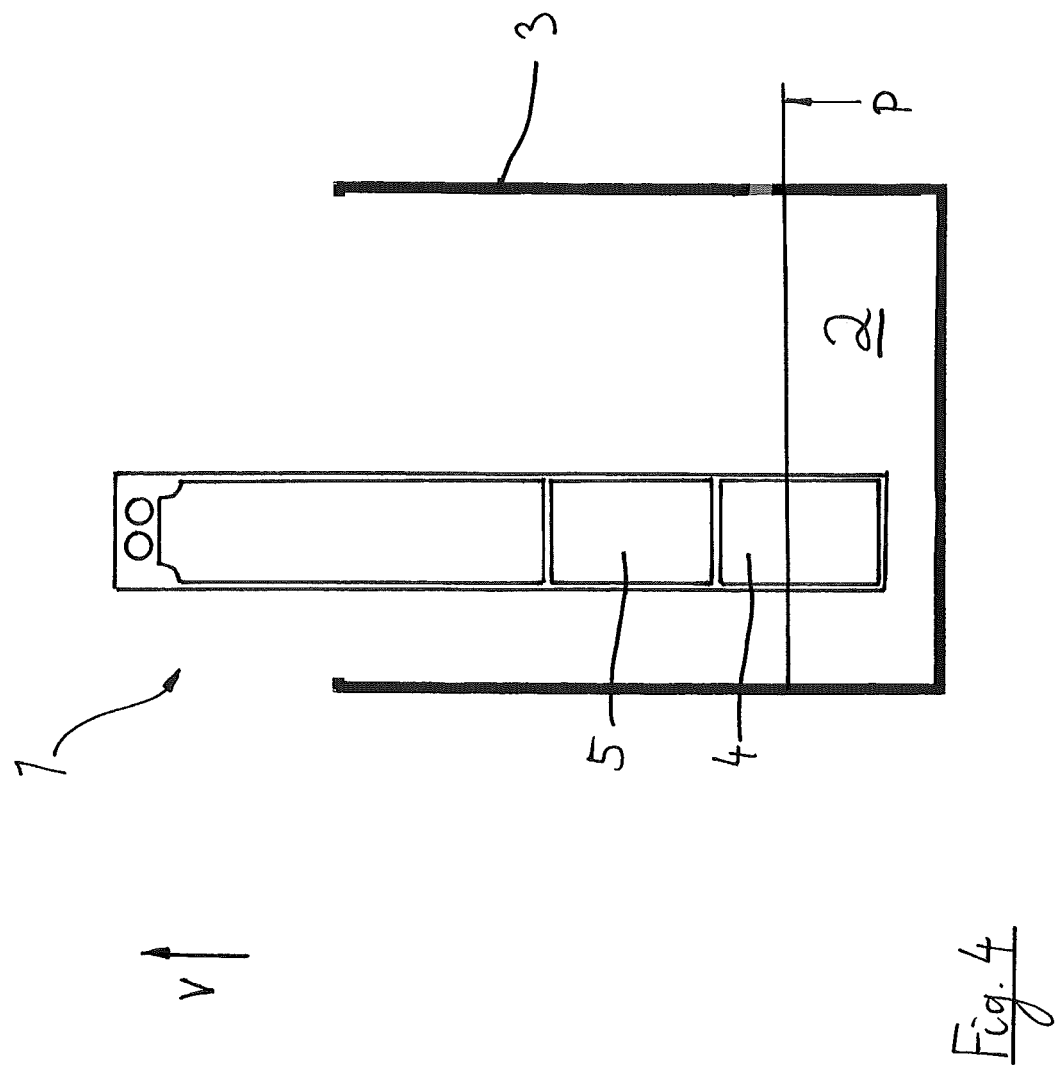

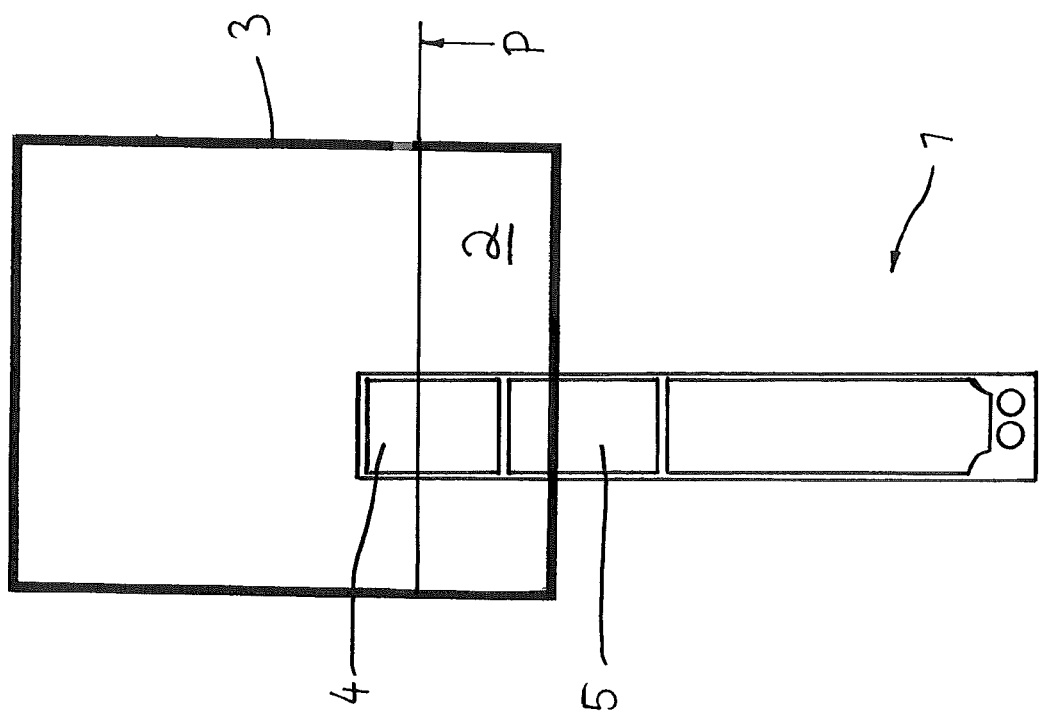

FILL LEVEL MEASUREMENT SYSTEM

CROSS-REFERENCE

This application is the U.S. National Stage of International Application No. PCT/EP2014/058183 filed on Apr. 23, 2014, which claims priority to German patent application No. 10 2013 207 446.8 filed on Apr. 24, 2013.

TECHNOLOGICAL FIELD

The invention relates to a fill-level measurement arrangement for measuring the fill level of a fluid in a container, wherein the fill-level measurement arrangement includes sensors that are configured for measuring a capacitance.

BACKGROUND

With low-viscosity media (such as, for example, water and of oils), the measuring of fill levels is frequently performed mechanically using a so-called float switch. In contrast, with high-viscosity media (such as, for example, fluid greases) an electronically working capacitive sensor is often used.

It is also technically possible to measure a fill level of oil with a capacitive sensor; however for cost reasons this is impractical with presently available sensors. Disadvantageously, therefore, different sensor types must be used to measure the fill levels of different mediums. This leads to a high number of variants, which in turn incurs costs.

Here the capacitive sensors available to date are constructed in part relatively complex and thus not very compact. Furthermore, they are expensive.

SUMMARY

The object of the invention is to further develop a fill-level measurement arrangement of the above-mentioned type such that a simpler and thus more cost-effective design is made possible, wherein the capacitive fill-level measuring should retain its full functionality.

The solution of this object by the invention is characterized in that the fill-level measurement arrangement includes a housing, wherein a first sensor is disposed in a first height position and a second sensor in a second height position, wherein both sensors are connected to an evaluation electronics unit for measuring the respective capacitance, wherein the first sensor is disposed with a surface in a first clearance from a wall section of the housing, wherein the second sensor is disposed with a surface in a second clearance from a wall section of the housing, wherein the second clearance is larger than the first clearance.

It is thereby possible that the dielectric constant of the to-be-measured medium is determined virtually directly by the first sensor, while the second sensor comparatively measures the dielectric constant of a constant medium—usually the air in the interior of the housing. The measured values of the sensors are compared to each other and the fill level of the medium is thus deduced.

The first sensor and the second sensor are preferably disposed on a carrier element, which is as a rule configured plate-like. The carrier element can be at least partially configured as a circuit board and include the evaluation electronics unit. It can carry both sensors as well as the evaluation electronics unit and be configured as a rectangular plate.

The first clearance is preferably zero; thus the sensor surface thus abuts directly on the corresponding wall section of the housing.

The second clearance preferably falls in the range between 0.5 cm and 10 cm, particularly preferably between 1 cm and 3 cm.

The two sensors are preferably configured geometrically identical, wherein preferably a design as thin rectangular elements is provided.

The housing is preferably comprised of a non-conducting material, in particular of plastic.

The evaluation electronics unit preferably includes a single oscillator. This is preferably configured as an LC oscillator. The switching between the electrodes can be effected, for example, via PIN diodes.

The proposed fill-level measurement arrangement allows an unprecedented minimalized design for universal applications by a comparative measurement; this makes possible a substantial reduction of costs, wherein simultaneously the full functionality of a capacitively operating sensor is maintained. In addition, advantages with respect to robustness arise from the design. In operation the arrangement is characterized by an economical low power consumption.

The sensor can be attached inside or—in a form modified with respect to shielding—also outside the medium, since the controller or the electronics unit can be provided with a "teach mode," which can take into account the respective specific environmental conditions. Various active shielding principles can be used (for example, guarding, driven shield, or bootstrapping) for shielding of the assembly outside the container.

The switching of the sensor in a "teach mode" by short-circuiting of the signal line by the +line is a preferred possibility in this respect.

In this respect the invention provides a capacitively working universal fill-level sensor for oils and fluid greases. Using it an electronic universal sensing of the fill level of the oil or of the fluid grease (in particular of the NLGI classes 000 and 00) in a housing is possible based on a comparative capacitive measurement.

Overall, the following advantages result of the proposed fill-level measurement arrangement:

A simpler and more cost-effective design of the arrangement is given by integration of the evaluation electronics unit and the sensors (measurement electrodes) on a single circuit board.

Due to the use of a reference sensor (reference electrode) only measurements of frequency ratios or frequency differences are required. The providing of an exact, quartz-stable absolute frequency is not required.

The reference- and medium-measurements occur via one and the same LC oscillator. In this way there are no errors due to different oscillator drifts.

The switching of the measurement electrodes is preferably effected very simply and economically via PIN diodes. Despite the simple design the decoupling of measurement- and reference electrodes is fully adequate.

The oscillator is preferably comprised of a modified Schmitt-trigger oscillator. The usual resistance between input and output is replaced by an inductance. A relatively stable LC oscillator thereby results, which oscillates without problems under all conditions.

The controlling of the PIN diodes and the frequency evaluation are effected directly via the port pins of a small microcontroller. Expensive intermediate drivers are not required.

Preferably in each second (naturally other, in particular, larger time intervals are also possible) a single measurement is performed, which respectively only requires 5 ms. The rest of the time the oscillator is switched off. In this manner the power consumption and the risk of shortwave interference are greatly reduced.

All usual standards for industrial electronic components can be integrated in the circuit board, i.e., a "short circuit protection", a "reverse polarity protection" and a "surge protection".

The supply voltage can be used over a wide voltage range of, for example, 8 V to 36 V (maximum 40 V). The sensitivity of the sensor can be adjusted via a "teach mode" to the environment and type of attachment (inside or outside of the media reservoir) or to the geometry of the housing.

BRIEF DESCRIPTION OF THE DRAWINGS

Exemplary embodiments of the invention are depicted in the drawings.

FIG. 3 shows the front view of the fill-level measurement arrangement without housing, FIG. 4 shows the installation situation of the fill-level measurement arrangement (depicted without housing) in a fluid container in a hanging manner, FIG. 5 shows the installation situation of the fill-level measurement arrangement (depicted without housing) in a fluid container in a standing manner.

DETAILED DESCRIPTION

Figure 2:
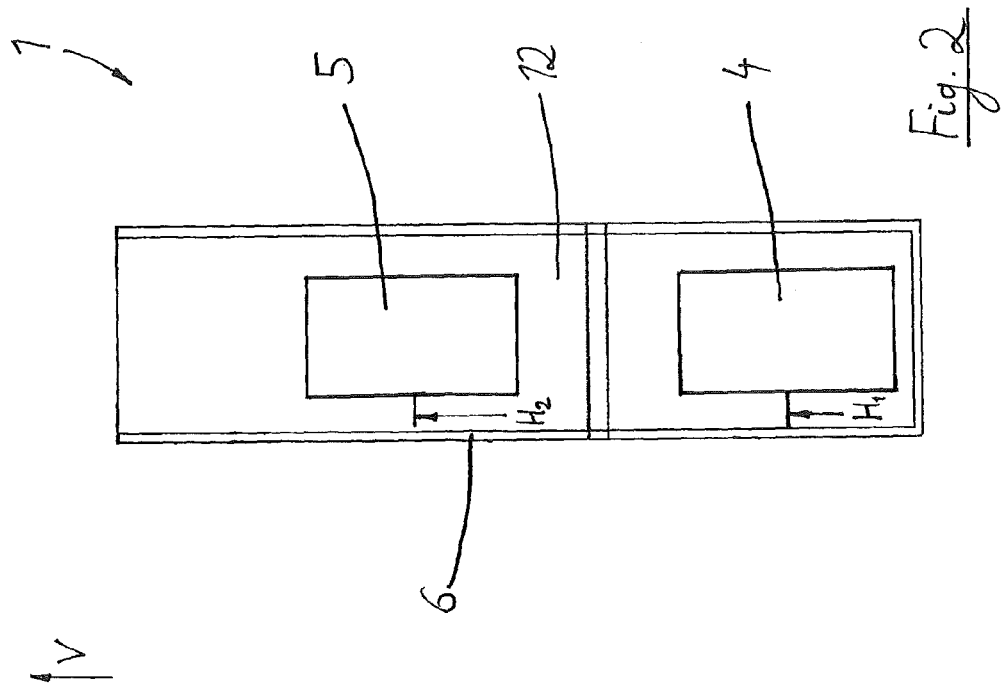
FIG. 2 shows the fill-level measurement arrangement according to FIG. 1 in front view.
Figure 1:
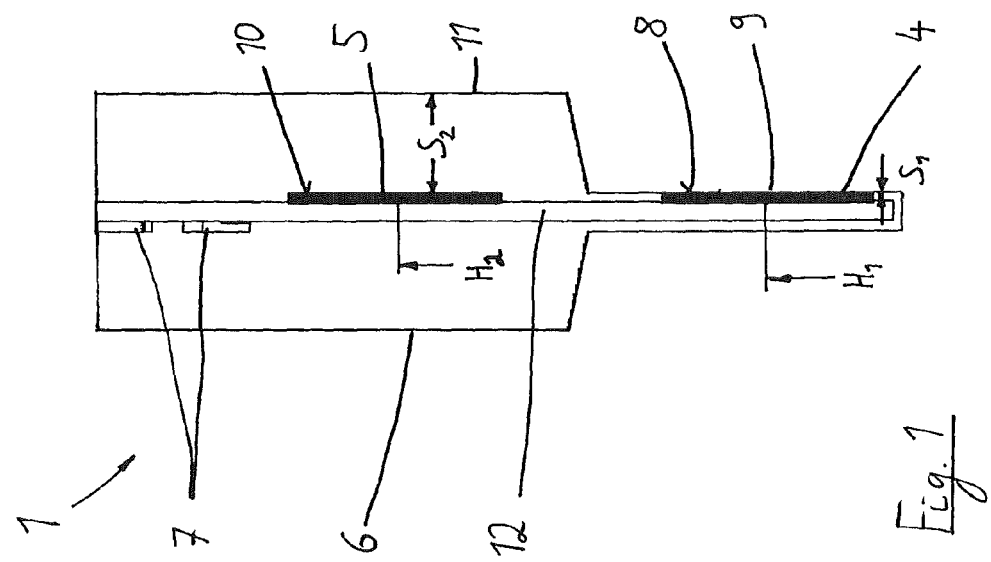
FIG. 1 schematically shows an inventive fill-level measurement arrangement in side view.

In FIG. 1 and FIG. 2 a fill-level measurement arrangement 1 is outlined that is configured according to a preferred exemplary embodiment of the invention. The central component of the fill-level measurement arrangement 1 is a carrier element 12, which is configured as a circuit board and with intended use is disposed extending in vertical direction V. Essential elements are two sensors or electrodes 4 and 5, which in the present case are configured as plate-shaped elements and disposed on the carrier element 12. Here the electrodes 4, 5 respectively have free surfaces 8 and 10. The first sensor 4 functions as a measurement electrode, the second sensor 5 as a reference electrode. Furthermore, an additional evaluation electronics unit 7 is disposed on the carrier element 12, which evaluation electronics unit 7 is in electrical connection with the two electrodes 4, 5.

As can be seen, the two electrodes 4 and 5 are disposed at different height positions or height levels $H_1$ and $H_2$. The carrier element 12 together with electrodes 4, 5 and evaluation electronics unit 7 is embodied as a plate-shaped module, which is housed in a housing 6.

The design of the housing 6 has the particularity that the width of the housing 6 is different in the two height positions $H_1$ and $H_2$: while in the region of the first height position $H_1$, i.e., over the height extension of the first electrode 4, the housing 6 is configured narrow ("beak-like"), in the region of the second height position $H_2$, i.e., over the height extension of the second electrode 5, it is significantly wider. This has the result that the clearance $s_1$ between the surface 8 of the first sensor 4 and the wall section 9 that opposes the first electrode 4 is significantly smaller (namely, is preferably even zero) than the clearance $s_2$ between the surface 10 of the second electrode 5 and the wall section 11 that opposes the second electrode 5. The first sensor 4, i.e., the measurement electrode, is thus disposed in a type of "beak" of the housing 6 in close proximity to the corresponding housing section 9, while this does not apply to the second sensor 5, i.e., to the reference sensor; here a space, in the present case filled with air, is present between the sensor surface 10 and the wall section 11, which space ensures a constant dielectric constant of the reference electrode (however, the filling of the space can also be effected with another medium).

The effect thereby achievable is described below.

The arrangement of the measurement- and reference-electrodes is depicted in FIG. 3.

In each of FIGS. 4 and 5 a container 3 is outlined, wherein a medium 2 (for example fluid grease) is contained to be measured with respect to its fill level. The aim is therefore to measure the fill level P of the medium 2 in the container 3 in a capacitive manner using the fill-level measurement arrangement 1.

In FIG. 4 a hanging installation of the fill-level measurement arrangement 1 can be seen, i.e., the arrangement is attached in a hanging manner on the upper end and extends down into the medium 2.

In contrast, in FIG. 5 a standing measurement arrangement is outlined, according to which the fill-level measurement arrangement 1 extends into the container 3 from below.

Figure 6:
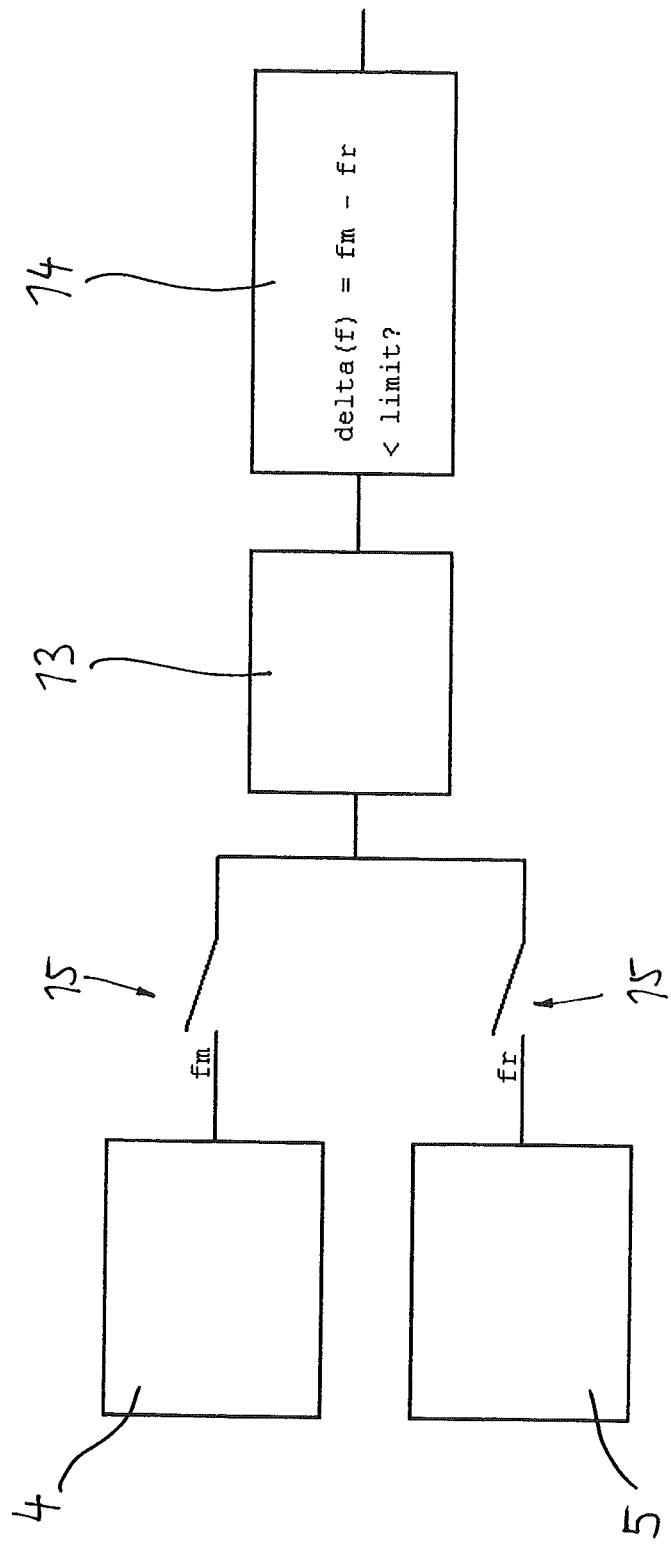
FIG. 6 shows a block diagram with indication of the operation of the fill-level measurement arrangement.

Schematically in FIG. 6 a block diagram can be seen that illustrates the operation in the measuring of the fill level P in the container 3. Both sensors 4 and 5 are connected to an oscillator 13 via a switch 15, which oscillator 13 is in turn connected to a computer unit 14.

The oscillator 13 generates a periodically alternating voltage. There are indeed numerous possibilities for designing such an oscillator; however, in the present case an oscillator including a resonant LC circuit and an amplifier stage is preferred, which is favorable for a high-frequency vibration.

The switches 15 are preferably embodied as semiconductor switches in the form of a PIN diode (positive-intrinsic-negative diode). The capacitance of this diode in the off state is low and thus has only a slight influence on the measurement.

As can be seen, due to the use of a double-sided circuit board the proposed fill-level measurement arrangement 1 is embodied very compact. Since the function is based on a comparative measurement between measurement- and reference-electrodes 4, 5, the specifically configured housing 6 is required, i.e., a housing having a special geometry that encloses the reference electrode 5 and the measurement electrode 4 differently. The housing 6 is embodied such that it immediately directly encloses the measurement electrode 4 (almost no air between electrode and housing), while a defined space is maintained between the reference electrode 5 and the housing 6.

The housing 6 can be configured as a standalone housing or, however, be integrated into other housing components, such as, for example, in a cover. The fill-level measurement arrangement 1 is designed such that—as described—it can work standing vertically or hanging.

The following should be noted for operation:

The circuit board, i.e., the carrier element 12, has the two capacitances, namely the measuring capacitance (sensor 4) and the reference capacitance (sensor 5). The measurement capacitance 4 sits in the "beak" of the housing 6 (see FIG. 1) and "sees," to the extent possible, only the medium to be measured. The reference capacitance 5 lying there over initially "sees" the reference medium having constant dielectric constant (usually this is air) over the clearance $s_2$ up to the wall section 11, since the housing 6 here does not closely abut (as is the case with the measuring capacitance 4 in the case of the "beak"). Only then does the reference capacitance 5 "see" the medium.

The measuring principle is comparative: while the measured dielectric constant of the measurement sensor changes with changing fluid level below the switch point, that of the reference sensor remains constant due to the reference medium constantly surrounding it. With changing dielectric constant of the measurement sensor, a signal is then present from which it can be concluded that the container 3 has reached its minimum fill level P.

If fluid is present in the container, then both sensors detect constant dielectric constants. The height of the fill level P can be deduced from the resulting change of this value for the measurement electrode.

The housing 6 of the fill-level measurement arrangement 1 is preferably configured round in cross-section in the region of the second sensor 5 as well as up to its upper end; the "beak," i.e., the region of the housing wherein the first sensor 4 is disposed, is preferably designed as an essentially cuboid-shaped having roundings in the lateral region.

It is only critical that in the region of the height extension of the respective sensors 4, 5 through the housing a more or less pronounced clearance is provided from the sensor surface up to the housing wall in order to carry out the described comparative measurement.

REFERENCE NUMBER LIST

1 Fill-level measurement arrangement
2 Fluid/medium (oil, grease)
3 Container
4 First sensor (measurement electrode)
5 Second sensor (reference electrode)
6 Housing
7 Evaluation electronics unit
8 Surface of the first sensor
9 Wall section
10 Surface of the second sensor
11 Wall section
12 Carrier element
13 Oscillator
14 Computer unit
15 Switch
$H_1$ First height position
$H_2$ Second height position
$s_1$ First clearance
$s_2$ Second clearance
P Fill level
V Vertical direction

The invention claimed is:

1. A fill-level measurement arrangement for measuring a fill level of a fluid in a container, the fill-level measurement arrangement comprising:
   a circuit board;
   a plate-shaped carrier element;
   first and second sensors configured to measure a capacitance and disposed on the plate-shaped carrier element including the circuit board, the first and second sensors comprising geometrically identical thin elements; and
   a housing comprising a first width with respect to a first wall section and a second width with respect to a second wall section,
   wherein the first width is not equal to the second width,
   wherein the first sensor is disposed in a first height position on the plate-shaped carrier element,
   wherein the second sensor is disposed in a second height position on the plate-shaped carrier element,
   wherein the first sensor and the second sensor are connected to an evaluation electronics unit mounted on the circuit board for measuring a capacitance sensed by the first sensor and a capacitance sensed by the second sensor,
   wherein the first sensor is disposed with at least a first surface portion with zero clearance from the first wall section of the housing, and
   wherein the second sensor is disposed with at least a second surface portion at a clearance of 0.5 cm to 10 cm from the second wall section of the housing.

2. The fill-level measurement arrangement according to claim 1, wherein the housing is comprised of non-conductive material.

3. The fill-level measurement arrangement according to claim 1, wherein the evaluation electronics unit includes a single oscillator.

4. The fill-level measurement arrangement according to claim 1, wherein the evaluation electronics unit includes PIN diodes for the switching the capacitance detection of the sensors.

5. The fill-level measurement arrangement of claim 1, wherein the plate-shaped carrier comprises a rectangular plate.

6. The fill-level measurement arrangement of claim 1, wherein the second sensor is disposed with the second surface portion at a clearance of from 1 to 3 cm from the second wall section of the housing.

7. The fill-level measurement arrangement according to claim 1, wherein the housing is comprised of plastic.

8. The fill-level measurement arrangement according claim 1, wherein the evaluation electronics unit includes a single LC oscillator.

9. The fill-level measurement arrangement according to claim 1, wherein the housing comprises plastic, and wherein the evaluation electronics unit includes a single LC oscillator and PIN diodes for the switching the capacitance detection of the sensors.

10. A fill-level measurement apparatus for measuring a fill level of a fluid in a container, comprising:
    a housing having a first end and a second end; and
    first and second substantially identical thin capacitive sensors mounted on a carrier plate in the housing, the carrier plate including a circuit board and a microcontroller mounted on the circuit board,
    wherein the housing comprises a first width with respect to a first inner wall portion and a second width with respect to a second inner wall portion,
    wherein the first width is not equal to the second width,
    wherein the first sensor is mounted in the housing at a first distance from the first end with a first surface portion in contact with the first inner wall portion of the housing and the second sensor is mounted in the housing between the first sensor and the second end of the housing, the second sensor being mounted with a clearance of 0.5 to 10 centimeters from the second inner wall portion of the housing, the first sensor and the second sensor being configured to communicate with the microcontroller.

* * * * *